W. S. TAYLOR, Jr.
MECHANICAL MOVEMENT.
APPLICATION FILED APR. 3, 1908.
924,509.
Patented June 8, 1909.
2 SHEETS—SHEET 1.
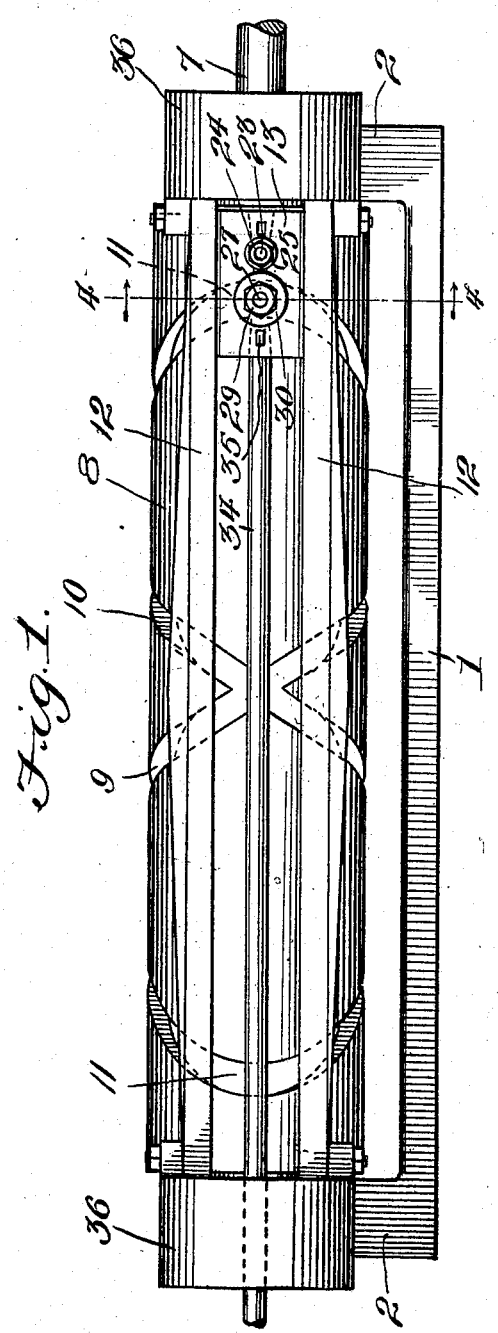
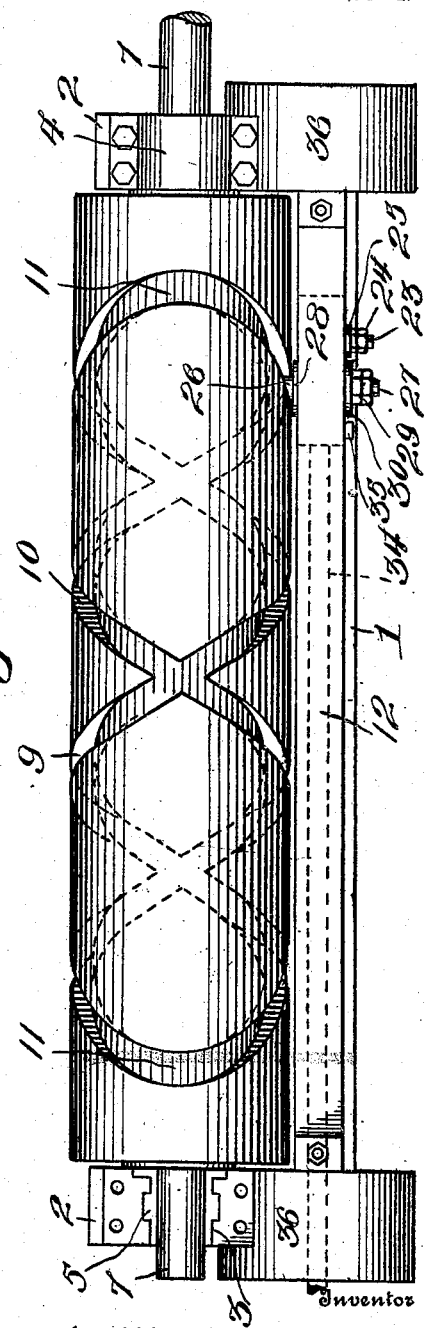
Witnesses
J. T. L. Wright,
C. C. Hines.
Inventor
William S. Taylor, Jr.
By Victor J. Evans,
Attorney

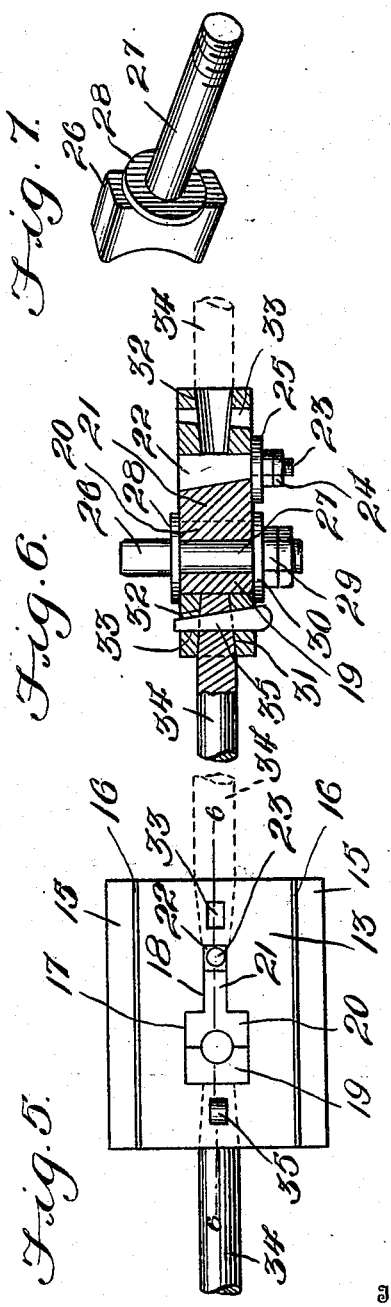

UNITED STATES PATENT OFFICE.

WILLIAM S. TAYLOR, JR., OF SALT LAKE CITY, UTAH.

MECHANICAL MOVEMENT.

No. 924,509.  Specification of Letters Patent.  Patented June 8, 1909.

Application filed April 3, 1908. Serial No. 424,972.

*To all whom it may concern:*

Be it known that I, WILLIAM S. TAYLOR, Jr., a citizen of the United States, residing at Salt Lake City, in the county of Salt Lake and State of Utah, have invented new and useful Improvements in Mechanical Movements, of which the following is a specification.

This invention relates to certain new and useful improvements in mechanical movements or power transmitting mechanism for converting curvilinear into rectilinear motion, or vice versa.

The object of the invention is to provide a simple type of power transmitting mechanism which is adapted for either of these purposes, and in which the construction is such as to secure an easy running motion and ready assemblage or disassemblage of the operating parts.

With these and other objects in view, the invention consists of the features of construction, combination and arrangement of parts hereinafter fully described and claimed, reference being had to the accompanying drawings, in which:—

Figure 1 is a side elevation of the apparatus. Fig. 2 is a top plan view of the same with one of the bearing caps removed. Fig. 3 is an end elevation of the apparatus. Fig. 4 is a transverse section on line 4—4 of Fig. 1. Fig. 5 is a side view of the cross-head and associated parts, with the retaining nuts of the cross-head traveler stem removed. Fig. 6 is a longitudinal section of the same with all of the parts in position. Fig. 7 is a perspective view of the cross-head traveler.

Referring to the drawings, 1 designates a suitable base or frame, at the ends of which are standards or pillow-blocks 2, provided at their upper ends with bearing recesses 3 closed by bearing caps 4, the recesses of the standards and caps receiving bearing brasses 5 locked from rotary motion by suitable keys 6. Journaled in the said bearing brasses 5 is a shaft 7, which is preferably enlarged in any suitable manner between the bearings to form a drum 8 arranged at one side of the longitudinal center of the frame and provided in its surface with right and left hand grooves or threads 9 and 10 connected at their ends by intersecting or return grooves 11, thus forming a continuous right and left thread or groove longitudinally along the surface of the drum.

Disposed along one side of the drum and in parallel relation therewith at the other side of the longitudinal center of the frame are upper and lower longitudinal rails 12 forming a guideway for a reciprocatory cross-head block 13, the inner faces of said rails being formed with longitudinal guide grooves 14 to receive guide tongues 15 on the upper and lower longitudinal edges of said cross-head block, the rail grooves being preferably provided with metallic liners 16 to sustain the wear from the rubbing contact of the tongues of the blocks.

The block 13 is formed with a transverse slot 17 having a contracted portion 18, and in said slot is fitted a bearing bushing transversely divided to form two sections 19 and 20 which snugly fit the slot and coincide in width with the width of the block, the section 20 of the bushing being formed with a tongue or extension 21 to fit within said contracted portion 18 and having its free end beveled or inclined. The tongue 21 is of less length than the slot extension 18, leaving room between its beveled end and the outer wall of said slot extension for the reception of a tapered locking key 22 which when inserted holds the bushing sections from relative movement. The inclined face of this key bears against the beveled face of the tongue, while the reduced end of the key is formed with a cylindrical threaded stem 23 on which are fitted retaining nuts 24, which, together with a washer 25 bearing against the adjacent face of the block, secures the key in position. When the key is removed the bushing section 20 may be moved away from the bushing section 19 to permit of the ready removal of said sections or the cross-head traveler, hereinafter described.

The cross-head block carries a traveler 26 in the form of a block member which projects into the grooves of the drum and is adapted to traverse the same, said traveler being properly shaped to easily fit the walls of the grooves and turn freely therein without excess of friction, the return portions 11 of the grooves being preferably widened to adapt the traveler to pass without binding in a curved path from the right to the left hand groove and vice versa. The traveler is provided with a supporting pin or stem 27 journaled in the bearing bushings 19 and 20 and provided at one end with a collar or head 28 to bridge the slot 17 at the inner side of the cross-head block and hold both the traveler and bushings from movement in an outward direction. The outer or free end of the stem is threaded to receive one or more retaining nuts 29 which are arranged to bear against a washer 30 conforming in size to the head 28 to bear against the reverse faces of the cross-head block and bushing section to hold these parts from movement in the opposite direction. The stem has free movement in the bearing to turn to a position at any angle to conform to the curvature of any part of the grooves in the drum, whereby an easy action is insured.

One or both ends of the cross-head block is or are provided with tapered receiving sockets 31 and 32, each intersected by a tapered cross slot 33. The sockets 31 and 32 are adapted to receive the inner tapered ends of shafts 34, whose tapered ends are provided with transverse slots for the passage of tapered keys 35 passing through the slot 33 for fastening said shaft ends in position. Where shafts are secured to the opposite ends of the cross-head block, as shown in full and dotted lines in Figs. 5 and 6, and extend in opposite directions therefrom, these shafts may be employed to transmit motion from the reciprocatory cross-head or member to devices of any kind to be operated, in which event the cross-head will be the driven member and the rotary drum the driving member, whereby curvilinear motion may be converted into reciprocatory motion and power transmitted to different elements upon the reverse strokes of the cross-head. On the other hand, one or two of these rods or shafts 34 may be employed for connection with the piston or pistons of a single or two simple or compound engines, the cylinders of which may be bolted to annular brackets 36 through which the said rods or shafts extend. These brackets are cast with or bolted on the bearing standards 2 and support the guide rails 12. It will thus be seen that the cross-head may be made to communicate motion to separate devices to be driven on the reverse strokes thereof by connecting oppositely extending shafts or rods therewith, or that it may communicate motion to a single element to be driven through the use of a single rod, or may itself be primarily driven by one or more power devices to impart motion to the drum, when it is desired to transform rectilinear into curvilinear motion. The described arrangement of the annular brackets also adapts the device to be reversed end for end and side for side, so that the engine may be arranged at the right or left of the frame and the drum disposed outwardly or inwardly from an adjacent wall, as circumstances in the use of the device may require, by which the device is better adapted for operation in confined spaces or situations where the drum must face in one direction or the other.

It will be understood in practice that on the movement of either the drum or the cross-head traveler, one or the other of said parts will be operated, the traveler running in the continuous right and left hand thread in the drum and being thereby on each revolution of the drum reciprocated back and forth a plurality of times. It will be apparent that the traveler may be driven by one or more power devices, such as steam engines to operate the drum, and that the rotary motion thereof may be transmitted from the shaft 7 to any parts to be driven; and that by driving the shaft 7 through belt and pulley connections from a motor or in any other manner the rotary motion of the drum may be converted into reciprocatory motion through the action of the cross-head and such motion transmitted therefrom to the parts to be driven in the manner previously described.

Having thus fully described the invention, what is claimed as new is:—

1. A power transmission mechanism comprising a frame provided with upright bearing blocks at the ends thereof, a rotary drum journaled in said bearing blocks and arranged at one side of the longitudinal center of the frame, said drum being provided with right and left spiral grooves terminally connected to form a continuous groove, a guideway comprising upper and lower longitudinal bars arranged at the opposite side of the longitudinal center of the frame, a cross head arranged to travel along said guideway and provided with a traveler engaging the grooves in the frame, a rod connected with said cross head, annular bracket members supported by the bearing blocks at the ends of the frame and forming supports for said guide bars to which the ends of said bars are attached, and a rod adapted to be connected with either end of the cross head and to reciprocate through either of said brackets.

2. A power transmission mechanism comprising a frame, a rotary drum journaled on the frame and provided with a continuous right and left hand spiral groove, a guideway on the frame in parallel relation to said drum, a cross-head arranged to reciprocate in said guideway and provided with a transverse opening having a reduced portion, a sectional bushing fitted within said opening, one of the sections of the bushing having a reduced portion fitting in said reduced portion of the opening and formed with a beveled end, a tapered key inserted in said reduced portion of the opening and engaging the beveled end of said section to secure the bushing against longitudinal movement, a traveler engaging the groove in the drum and provided with a stem journaled in said bushing and provided with portions engaging the opposite sides of the bushing and cross-head and bridging across said opening to hold the bushing from lateral movement, and a reciprocating rod connected with the cross-head.

In testimony whereof I affix my signature in presence of two witnesses.

WILLIAM S. TAYLOR, Jr.

Witnesses:
W. R. HUTCHINSON,
O. C. SINCLAIR.